(12) United States Patent
Kano et al.

(10) Patent No.: US 10,120,486 B2
(45) Date of Patent: Nov. 6, 2018

(54) DISPLAY DEVICE THAT CAN BE DIVIDED INTO MULTIPLE SECTIONS BY USER INPUT AND PROGRAM FOR ACHIEVING THE DIVISION

(71) Applicant: Murata Manufacturing Co., Ltd., Nagaokakyo-shi, Kyoto-fu (JP)

(72) Inventors: Hidekazu Kano, Nagaokakyo (JP); Hiroaki Kitada, Nagaokakyo (JP); Takafumi Inoue, Nagaokakyo (JP); Masato Saito, Nagaokakyo (JP); Kenichi Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 141 days.

(21) Appl. No.: 15/098,739

(22) Filed: Apr. 14, 2016

(65) Prior Publication Data

US 2016/0231857 A1 Aug. 11, 2016

Related U.S. Application Data

(63) Continuation of application No. PCT/JP2014/079292, filed on Nov. 5, 2014.

(30) Foreign Application Priority Data

Nov. 8, 2013 (JP) .................................. 2013-231737

(51) Int. Cl.
*G09G 5/00* (2006.01)
*G06F 3/041* (2006.01)
(Continued)

(52) U.S. Cl.
CPC ............ *G06F 3/0416* (2013.01); *G06F 3/044* (2013.01); *G06F 3/0414* (2013.01);
(Continued)

(58) Field of Classification Search
CPC ...... G06F 3/044; G06F 3/0414; G06F 3/0416; G06F 2203/04808; G06F 2203/04886; G06F 3/04883; G06F 3/04886
(Continued)

(56) References Cited

U.S. PATENT DOCUMENTS

2011/0107272 A1* 5/2011 Aguilar ............... G06F 3/04815
715/853
2011/0109204 A1 5/2011 Tajitsu et al.
(Continued)

FOREIGN PATENT DOCUMENTS

JP 2003319244 A 11/2003
JP 2007241410 A 9/2007
(Continued)

OTHER PUBLICATIONS

International Search Report issued for PCT/JP2014/07292, dated Jan. 20, 2015.
(Continued)

*Primary Examiner* — Jennifer Nguyen
(74) *Attorney, Agent, or Firm* — Arent Fox LLP

(57) ABSTRACT

A mobile terminal device detects a touch position on a display screen, and detects that the display screen has been pressed and sets a boundary line based on the touch position. The mobile terminal device divides the display screen into first and second screens separated by the boundary line and displays images corresponding to different functions of the mobile terminal device on the first and second screens.

17 Claims, 14 Drawing Sheets

(51) Int. Cl.
  *G06F 3/0488* (2013.01)
  *G09G 5/14* (2006.01)
  *G06F 3/044* (2006.01)
  *G06F 3/0484* (2013.01)

(52) U.S. Cl.
  CPC ........ *G06F 3/0488* (2013.01); *G06F 3/04845* (2013.01); *G06F 3/04883* (2013.01); *G06F 3/04886* (2013.01); *G09G 5/14* (2013.01); *G06F 2203/04105* (2013.01); *G06F 2203/04803* (2013.01); *G09G 2354/00* (2013.01)

(58) Field of Classification Search
  USPC .......................... 345/156, 173–178; 718/863
  See application file for complete search history.

(56) References Cited

U.S. PATENT DOCUMENTS

| | | | |
|---|---|---|---|
| 2012/0176322 A1 | 7/2012 | Karmi et al. | |
| 2012/0249473 A1* | 10/2012 | Suzuki | B60K 37/06 345/174 |
| 2012/0293433 A1* | 11/2012 | Yamamoto | G06F 3/0412 345/173 |
| 2013/0167078 A1* | 6/2013 | Monnig | G06F 3/0484 715/800 |
| 2013/0342482 A1* | 12/2013 | Kim | G06F 3/0488 345/173 |
| 2014/0192245 A1* | 7/2014 | Lee | H04N 5/23293 348/333.05 |
| 2014/0359526 A1 | 12/2014 | Oshima | |
| 2015/0033193 A1* | 1/2015 | Beaurepaire | G06F 3/04845 715/863 |
| 2015/0331517 A1* | 11/2015 | Filiz | G06F 3/0414 345/173 |
| 2016/0110100 A1* | 4/2016 | Wang | G06F 3/04886 715/762 |
| 2017/0223264 A1* | 8/2017 | Jung | H04N 5/23212 |

FOREIGN PATENT DOCUMENTS

| | | |
|---|---|---|
| JP | 2012113645 A | 6/2012 |
| JP | 2013114558 A | 6/2013 |
| WO | WO 2009139237 A1 | 11/2009 |
| WO | WO 2012050174 A1 | 4/2012 |
| WO | WO 2012094656 A1 | 7/2012 |

OTHER PUBLICATIONS

Written Opinion of the International Searching Authority issued for PCT/JP2014/079292, dated Jan. 20, 2015.

* cited by examiner

FIG. 2
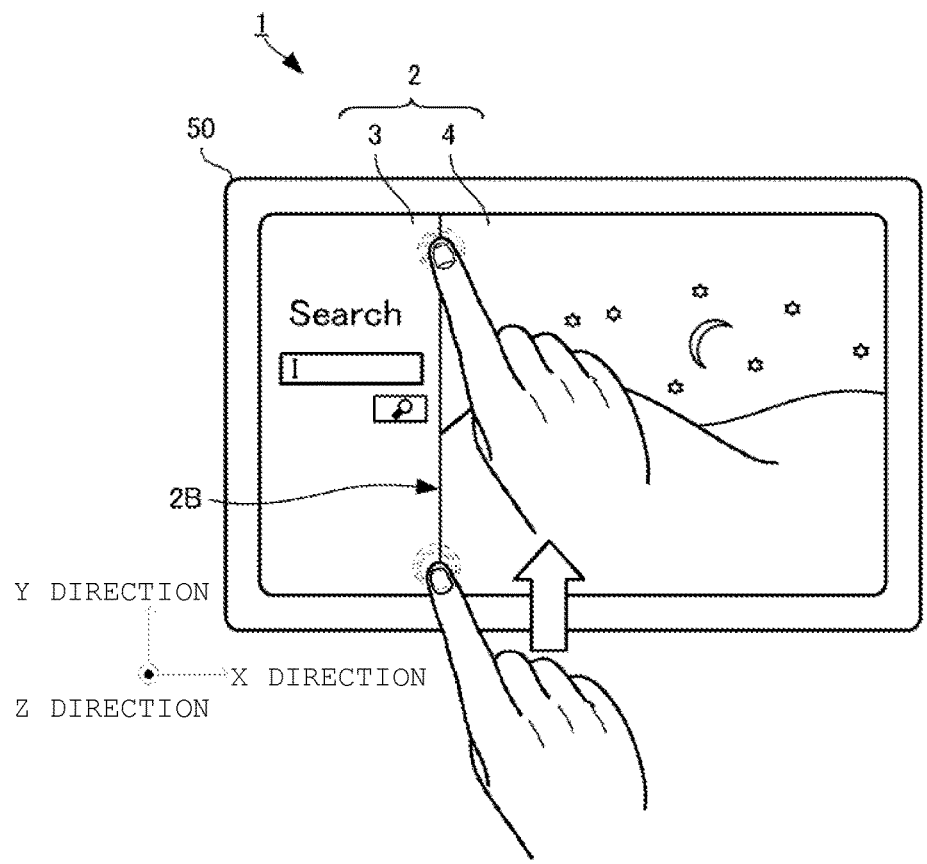
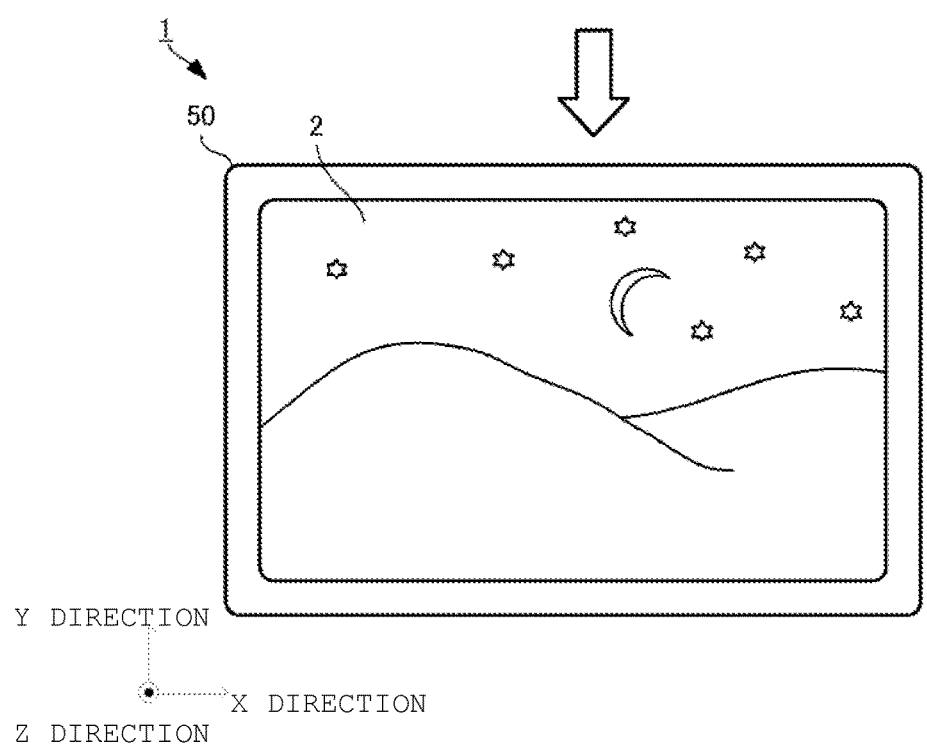

DISPLAY DEVICE THAT CAN BE DIVIDED INTO MULTIPLE SECTIONS BY USER INPUT AND PROGRAM FOR ACHIEVING THE DIVISION

CROSS REFERENCE

The present application is a continuation of International application No. PCT/JP2014/079292, filed Nov. 5, 2014, which claims priority to Japanese Patent Application No. 2013-231737, filed Nov. 8, 2013, the entire contents of each of which are incorporated herein by reference.

TECHNICAL FIELD

The present invention relates to a display device which accepts a touch operation with respect to a display screen, and a program.

BACKGROUND ART

Recently, display screens of electronic devices such as mobile telephones have become larger. When a plurality of pieces of different information are displayed on a display screen, it is possible to more effectively use the display screen. Japanese Patent Application Laid-Open No. 2007-241410 discloses a display device which can display a plurality of video images on a display device. The display device disclosed in Japanese Patent Application Laid-Open No. 2007-241410 divides the display screen into two based on a line segment defined by position coordinates of two points on the screen touched by the user within a predetermined time period and displays video images of different sources on the respective display screens.

SUMMARY OF THE INVENTION

Problem to be Solved by the Invention

However, as disclosed in Japanese Patent Application Laid-Open No. 2007-241410, there is a concern that an operation performed by specifying one point, then moving a finger away from the screen and specifying another point forms divided areas whose sizes are not intended by a user and divides the screen at an unintended position.

It is therefore an object of the present invention to provide a display device whose display screen can be divided at a desired position and whose divided display screens can be adjusted to a desired position and size, and a program for doing so.

Means for Solving the Problem

The display device preferably comprises a display screen, a touch sensor for detecting a position on the display screen that is touched by a user of the display device and for generating a touch signal as a function thereof, a press sensor for detecting the force with which the user touches the display screen and for generating a press force signal as a function thereof, and means for dividing the display screen into at least two sections as a function of the touch signal and the press force signal and for displaying separate content on the first and second sections.

The separate content in the first and second sections relate to different functions of the display device. The means can remerge the divided screen sections into a single screen section as a function of the touch signal and the press force signal.

The means preferably divides the display screen into the at least two sections as a function of the movement of the user's finger along the display screen. To that end, the means preferably determines that the user's finger has moved along the display screen by detecting that the user has touched the display screen with at least a threshold force and, while maintaining at least the threshold force, moves his or her finger at least a predetermined distance along the display screen.

In accordance with yet another preferred embodiment, the means divides the display screen into first and second sections along a dividing line determined by the movement of the user's finger along the display screen. The means also allows the user to move the dividing line by dragging the dividing line along the display screen.

In yet another embodiment, the means detects the user of the display device has touched a point on the display screen located within a predetermined distance from an edge of the display screen with at least a threshold level of pressure and divides the screen into first and second sections along a dividing line extending through the touched point.

In another embodiment, the means divides the display screen into first and second sections divided by a diving line in response to a single touch of the display screen at a point on the display screen located within a predetermined distance from an edge of the display screen with at least a threshold level of force.

The display screen preferably has a length and a width and the dividing line extends parallel to either the length or the width. Alternatively, the dividing line can extend obliquely to both the length and the width.

The means can also divide the display screen into first and second sections defined by a dividing line in the form of a bent line. Alternatively the dividing line takes the form of a closed loop. In such a case, the first section is preferably wholly contained within the second section.

In a preferred embodiment, the means divides the display screen into first and second sections as a function of the movement of the user's finger along the display screen only while the user's finger presses against the display screen with at least a predetermined force.

In the preferred embodiment, the press sensor includes a flat piezoelectric film which is provided along a plane surface of the display screen and which is made of a chiral polymer. The chiral polymer is preferably a polylactic acid and more preferably a poly-L-lactic acid.

When, for example, PVDF (polyvinylidene fluoride) is used for the piezoelectric film, there is a concern that a body temperature of a user's finger transmits to the piezoelectric film and influences detection performed by the piezoelectric film. However, poly-L-lactic acid which does not have pyroelectricity is used, so that the piezoelectric film can precisely detect a press.

The invention is also drawn to a non-transitory computer readable memory containing a program which, when ran on one or more processors connected to a display device having a display screen, a touch sensor for detecting a position on the display screen that is touched by a user of the display device and for generating a touch signal as a function thereof and a press sensor for detecting the force with which the user touches the display screen and for generating a press force signal as a function thereof, will divide the display screen into at least two sections as a function of the touch signal and the press force signal and which will display separate content on the first and second sections.

The program preferably divides the display screen into the at least two sections as a function of the movement of the user's finger along the display screen. In a preferred embodiment, the program determines that the user's finger has moved along the display screen by detecting that the user has touched the display screen with at least a threshold pressure and, while maintaining at least the threshold pressure, moves his or her finger at least a predetermined distance along the display screen.

Preferably, the display device includes an automatic boundary line setting unit which, when the press detecting unit detects the press and the touch position is near an edge portion of the display screen, sets a boundary line extending from the touch position to a preset direction, and the display screen dividing unit divides the display screen based on the boundary line set by the automatic boundary line setting unit.

According to this configuration, it is possible to automatically set the boundary line in the predetermined direction by pressing the edge portion of the display area and, consequently, it is possible to easily divide the display screen.

Preferably, the touch position detecting unit occasionally detects the touch position, and, when the touch position detected by the touch position detecting unit changes, the display screen dividing unit divides the display screen based on the changed touch position.

According to this configuration, it is possible to set the first screen and the second screen to sizes or shapes which the user desires. When, for example, a boundary line is drawn on the display screen to divide the display screen into the first screen and the second screen based on this boundary line, the user can set the first screen and the second screen of the desired sizes or shapes by touching an arbitrary position of the display screen and then moving the touch position in a direction in which the user wants to set the display screen.

Preferably, the display device includes an end point determining unit which determines an end point of the touch position which changes while the touch position detected when the press detecting unit detects the press is a start point; a boundary line setting unit which sets a boundary line which passes the start point and the end point determined by the end point determining unit, and the display screen dividing unit divides the display screen based on the boundary line set by the boundary line setting unit.

According to this configuration, it is possible to easily set the boundary line for dividing the display area into the first screen and the second screen. More specifically, it is possible to set the boundary line by moving the touch position from an arbitrary point (start point) in the display area to another point (end point) (by sliding a finger or the like). Further, the user can slide the finger or the like from the start point to the end point without moving the finger or the like away from the display area and consequently can easily learn the boundary line to be set.

Preferably, the boundary line setting unit sets a straight boundary line.

According to this configuration, the user can set the straight boundary line without linearly sliding the finger.

Preferably, the boundary line setting unit sets a boundary line which lies along a trajectory of the touch position which changes.

According to this configuration, it is possible to set the boundary line between the first screen and the second screen to a curved line or a linear line, i.e., it is possible to freely set the boundary line.

Preferably, when a trajectory of the touch position forms a loop shape and the end point determined by the end point determining unit is within a predetermined range from the start point, the boundary line setting unit sets a boundary line which forms a closed area based on the trajectory of the loop shape.

According to this configuration, it is possible to form the first screen in the second screen (or the second screen in the first screen). When, for example, the first screen needs to be set to a rectangular shape, if a start point and an end point do not match during a setting of this boundary line, it is not possible to form a closed area encircled by the boundary line. However, when the end point is near the start point, it is regarded that the end point matches with the start point, so that it is not necessary to change a touch position (slide the finger) such that the first screen is fully closed. Consequently, it is possible to easily form the first screen (or the second screen) of the closed area.

Preferably, the display device includes a boundary line moving unit which moves the boundary line.

According to this configuration, it is possible to move the boundary line which is set once and, consequently, to change set sizes of the first screen and the second screen.

According to a configuration, when the press detecting unit continues detecting the press while the touch position changes, the display screen dividing unit divides the display screen, when the touch position is changed in a state where the press continues, the display screen is divided. Consequently, it is possible to prevent the display screen from being divided against the user's intention.

When, for example, PVDF (polyvinylidene fluoride) is used for the piezoelectric film, there is a concern that a body temperature of a user's finger transmits to the piezoelectric film and influences detection performed by the piezoelectric film. However, poly-L-lactic acid which does not have pyroelectricity is used, so that the piezoelectric film can precisely detect a press.

According to the present invention, it is possible to divide a display screen into a first screen and a second screen at a boundary line based on a pressed position of the display screen, and to perform image display control on the respective screens. It is only necessary to press at least one point of the display screen to divide the display screen, so that a user can easily perform a screen dividing operation.

BRIEF EXPLANATION OF DRAWINGS

FIG. 2 is a view for explaining a display mode of the mobile terminal device according to the first embodiment.

MODE FOR CARRYING OUT THE INVENTION

Preferred embodiments of a display device according to the present invention will be described below with reference to the drawings. Examples of a mobile terminal device incorporating the display device according to the present invention will be described as exemplary embodiments. The mobile terminal device is a mobile electronic device which enables an operation via a touch panel, and is, for example, a mobile telephone, a tablet or a music player.

Figure 1:
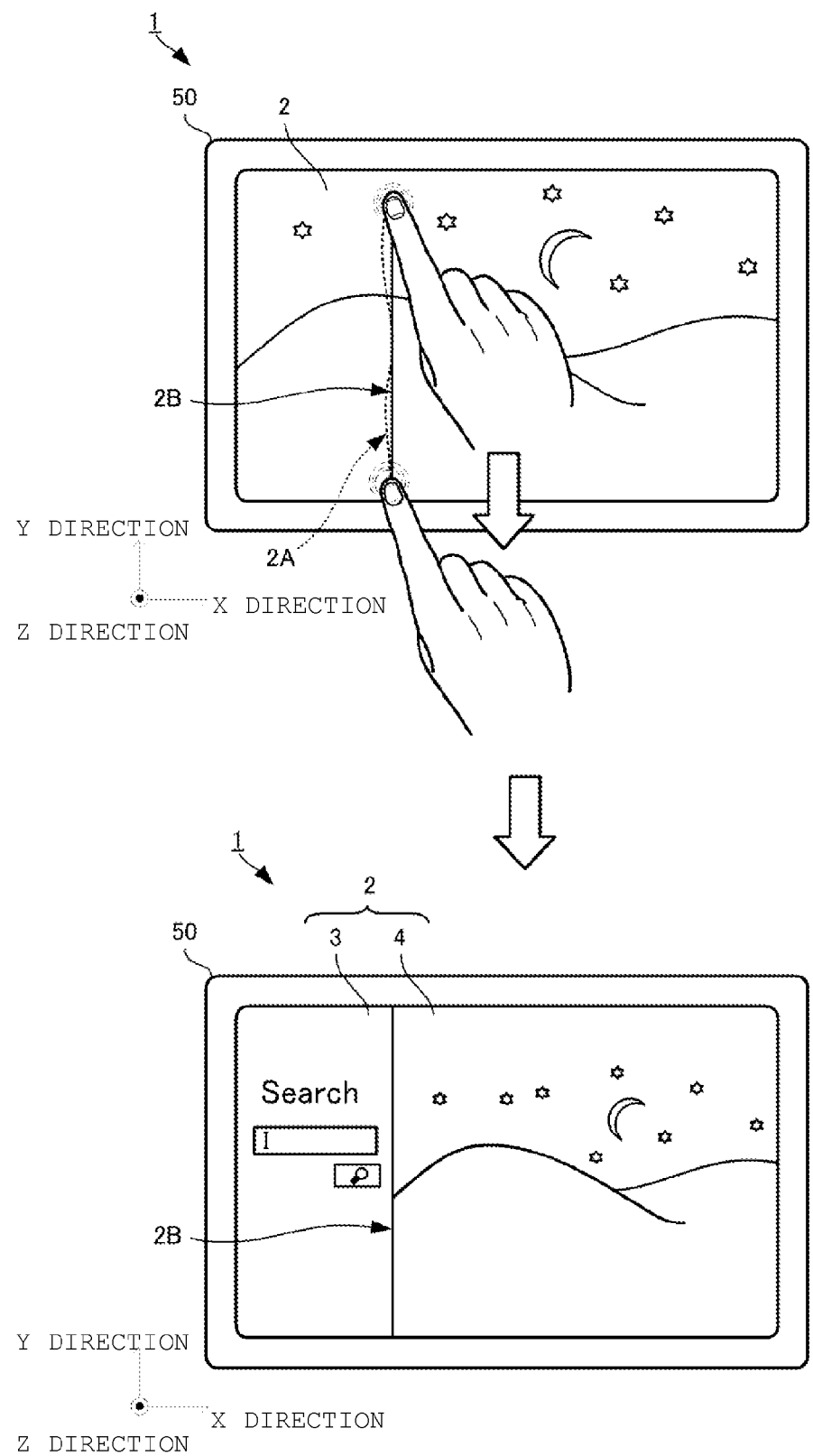
FIG. 1 is a view for explaining a display mode of a mobile terminal device according to a first embodiment constructed in accordance with the principles of the present invention.

FIGS. 1 and 2 are views for explaining a display mode of a mobile terminal device 1 according to the present embodiment. The mobile terminal device 1 includes a housing 50 having a nearly cuboid shape. Hereinafter, a longitudinal direction (width direction) of the housing 50 is an X direction and a direction (height direction) orthogonal to the X direction is a Y direction. Further, a thickness direction of the housing 50 is a Z direction.

The mobile terminal device 1 includes a display screen 2. On this display screen 2, an image having contents corresponding to a function executed by the mobile terminal device 1 is displayed. When, for example, the mobile terminal device 1 executes a television function, a television video image is displayed on the display screen 2, and, when the mobile terminal device 1 executes a web browsing function, a browser image is displayed on the display screen 2.

The mobile terminal device 1 accepts a user's input by way of a touch operation in which the user touches the display screen 2 using his or her finger. References to touching the display screen by the user's finger herein includes touching the display screen using a pen or other instrumentality by the user. In addition, if a protective cover is provided over the display screen, such a cover is provided, reference to touching the display screen include touching the protection cover. Touching as used herein means that the user's finger makes either physical or capacitive contact with the protection cover or display screen. When the user makes physical contact with the display screen (or protective cover), he or she will normally apply a pressing force (in the z direction).

In the present embodiment, by performing a predetermined touch operation on the display screen 2 as illustrated at an upper portion of FIG. 1, the user can divide the display screen 2 into a first screen portion 3 and a second screen portion 4 as illustrated at a lower portion in FIG. 1. When the display screen 2 is divided, separate images corresponding to two separate function, respectively, are preferably provided. Preferably when the display screen 2 is not divided, only an image having contents corresponding to a single function executed by the mobile terminal device 1 is displayed. When the display screen 2 is divided into two, images having contents corresponding to respectively different functions can be displayed simultaneously on the first screen 3 and the second screen 4. When, for example, the user wants to simultaneously display images of two functions of a television function and a search function, the user can display a search function execution image on the first screen 3 and display a television video image on the second screen 4. Alternatively, an image corresponding to the same function may be displayed on the first screen 3 and the second screen 4, respectively.

A touch operation for dividing the display screen 2 (referred to as a dividing operation below) is performed by pressing an arbitrary point on the display screen 2 using the user's finger or the like and sliding his or her finger nearly linearly along the Y direction as illustrated at the upper portion in FIG. 1. When the dividing operation is performed, a linear boundary line 2B which lies along the trajectory 2A (indicated by a broken line in FIG. 1) of the user's sliding finger is set to the display screen 2. Then, the display screen 2 is divided into the first screen 3 and the second screen 4 based on the boundary line 2B.

This dividing operation may be an operation performed by sliding the finger while a pressing force is applied at a start of an operation, or may be an operation performed by applying a pressing force with finger or the like at the start of the operation and then sliding the finger in a state where no pressing force is applied, i.e., in a state where the finger only touches the screen.

When the dividing operation is performed and when the trajectory 2A sways in the X direction (i.e., the trajectory 2A forms a curved line), if a sway range is within a predetermined value, this sway is corrected and the boundary line 2B is set to a linear line. Further, even when a start position and an end position of the dividing operation are not located at edges of the display screen 2, the boundary line 2B is set from one edge of the display screen 2 to the other. Furthermore, when the end position of the dividing operation in the X direction is different from the start position, if a distance between the start position and the end position in the X direction is no more than a predetermined amount (e.g. 1 cm), a boundary line is set to the linear boundary line 2B parallel to the Y direction which passes through the start position of the dividing operation. Hence, the user does not need to perform a careful dividing operation by sliding the finger straight in parallel to the Y direction without swaying the finger from the edge to the edge of the display screen 2.

After the display screen 2 has been divided into first and second screen portions 3 and 4, the user of the display device 1 can remerge the screen sections into a single screen as shown in the lower portion of FIG. 2 by, for example, tracing the boundary line 2B from the end position to the start position of the dividing operation as illustrated at an upper portion of FIG. 2. This is referred to hereafter as a connecting operation. This connecting operation may be the operation opposite to the dividing operation or may be an operation performed by tracing the boundary line 2B irrespectively of a direction.

Thus, by dividing the display screen 2 into first and second screen sections 3 and 4, and displaying respective images on the first and second screen sections 3 and 4, the user can execute two types of processing in parallel. Further, the boundary line 2B is set to lie along the trajectory 2A of the user's finger, so that the user can easily know how the display screen 2 will be divided by the dividing operation he or she performs. Furthermore, by performing the connecting operation by tracing the boundary line 2B, it is possible to re-connect the first and second screens. Consequently, the user does not need to reset the mobile terminal device 1 when remerging the screen.

FIGS. 1 and 2 illustrate examples where the line boundary line 2B lying along the Y direction is set. However, the boundary line is not limited to the linear line lying along the Y direction.

Figure 3:
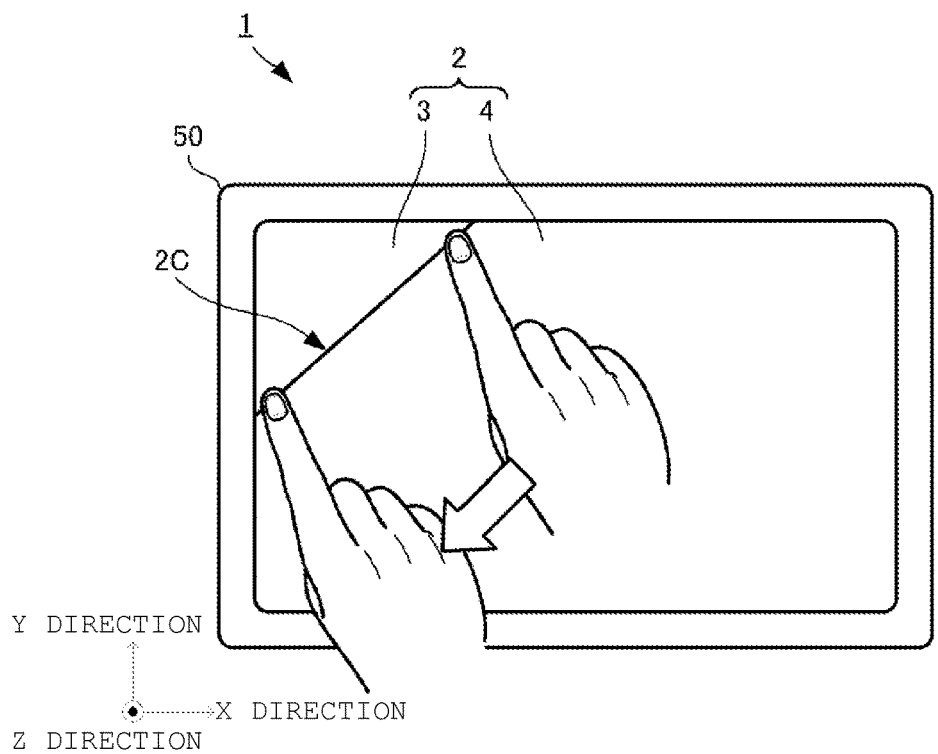
FIG. 3 is a view for explaining a case where an inclined boundary line is set.

FIG. 3 is a view for explaining a case where an inclined boundary line is set. In this example, the user slides his or her finger in an inclined direction with respect to the X direction and the Y direction to set a boundary line 2C which inclines with respect to the X direction and the Y direction. The display screen 2 will then be divided into first and second screen sections 3 and 4 based on (preferably delineated by) this boundary line 2C.

Figure 4:
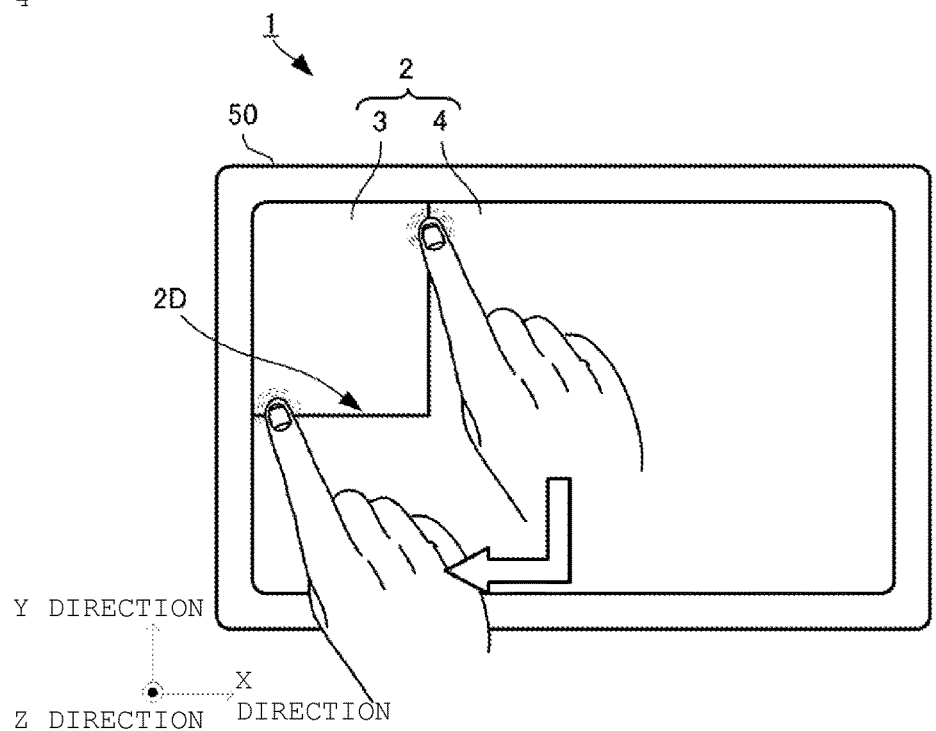
FIG. 4 is a view for explaining a case where a bent boundary line is set.

FIG. 4 is a view for explaining a case where a bent boundary line is set. In this example, the user slides his or her finger along the Y direction from the start position of a dividing operation and then slides his or her finger along the X direction to set a bent boundary line 2D. In response, the display screen 2 is divided into first and second screen sections 3 and 4 based on this boundary line 2D.

Figure 5:
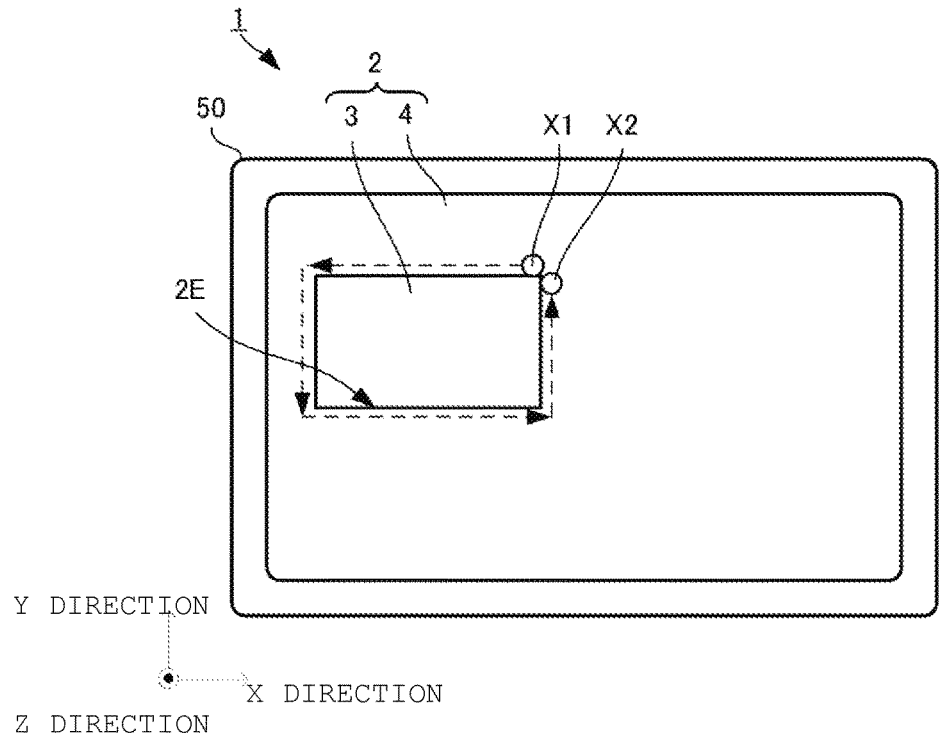
FIG. 5 is a view for explaining a case where a boundary line for forming a closed area is set.

FIG. 5 is a view for explaining a case where a boundary line for forming a closed area is set. In this example, the finger is slid in a loop shape (a rectangular shape in FIG. 5) from a start position X1 of a dividing operation to form a closed area and to set a boundary line 2E. In this case, when an end position X2 of the dividing operation is within a predetermined distance from the start position X1, it is recognized that the start position X1 and the end position X2 substantially match, and a boundary line 2F of a loop shape for forming the closed area is set. Hence, the user does not need to accurately slide the finger to form the closed area, and can easily set the boundary line 2F of the loop shape. The display screen 2 is divided into the first screen sections 3 and 4 based on this boundary line 2E. While FIG. 5 illustrates that the boundary line 2E has a rectangular shape, it may take a circular or any other desired closed shape.

Figure 6:
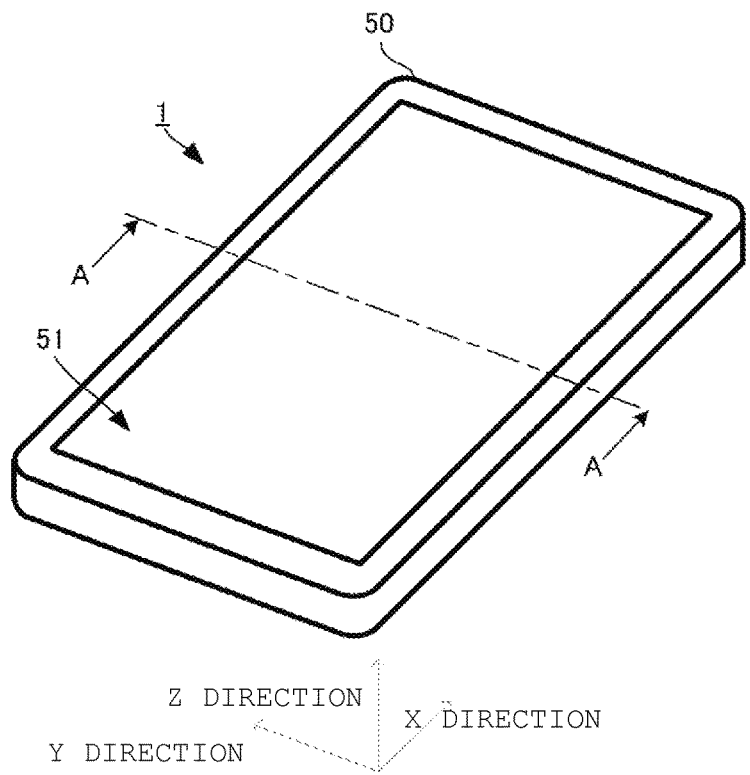
FIG. 6 is an external appearance perspective view of the mobile terminal device according to an embodiment.
Figure 7:
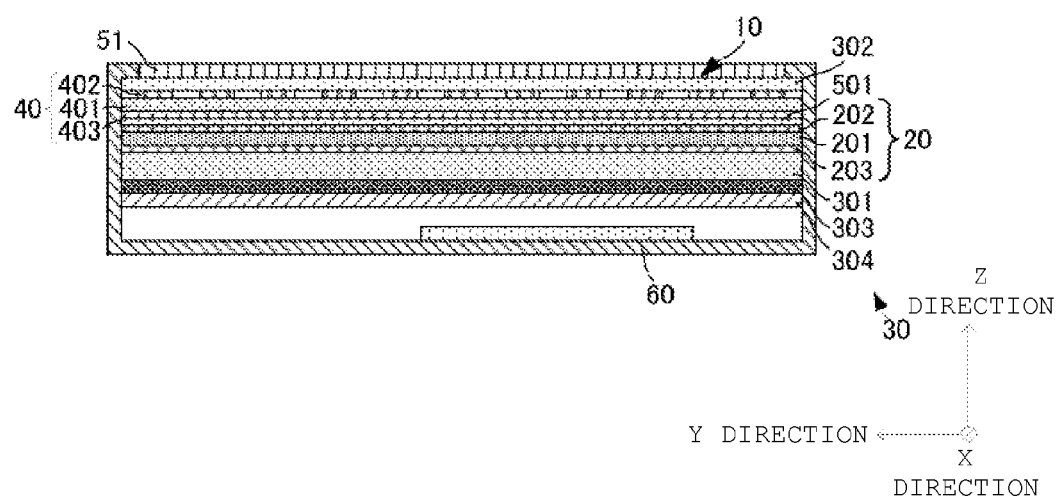
FIG. 7 is a sectional view taken along line A-A in FIG. 6.

FIG. 6 is an external appearance perspective view of a mobile terminal device 1 according to the present embodiment. FIG. 7 is a sectional view taken along line A-A in FIG. 6.

An opening (not illustrated) is formed in the housing 50, and, in this opening, an operation surface 51 which accepts a user's touch and pressing operation is provided. The operation surface 51 is preferably a resin protection cover which covers the display screen 2. A display input unit 10 is provided at the back of the operation surface 51.

The display input unit 10 includes a press sensor unit 20, a display panel unit 30 and a position detection sensor unit 40. A mounting substrate (not illustrated) is disposed at a position closer to the back surface side of the display input unit 10, and an arithmetic circuit module 60 is mounted on this mounting substrate.

The display panel unit 30 includes a liquid crystal panel 301 of a flat shape, a top surface polarizing plate 302, a back surface polarizing plate 303 and a backlight 304. When a drive signal is applied to the liquid crystal panel 301, a liquid crystal orientation state changes to form a predetermined image pattern. The display screen 2 is a screen displayed on the liquid crystal panel 301. The top surface polarizing plate 302 and the back surface polarizing plate 303 sandwich the liquid crystal panel 301. The backlight 304 is disposed at a side opposite to the side of the liquid crystal panel 301 across the back surface polarizing plate 303.

The press sensor unit 20 and the position detection sensor unit 40 are disposed between the liquid crystal panel 301 and the top surface polarizing plate 302. The position detection sensor unit 40 is positioned at the side of the top surface polarizing plate 302, and the press sensor unit 20 is positioned at the side of the liquid crystal panel 301. A translucent insulation layer 501 is formed between the press sensor unit 20 and the display panel unit 30. Alternatively, and without limitation, the press sensor unit 20 and the position detection sensor unit 40 may be provided between the top surface polarizing plate 302 and the operation surface 51.

The position detection sensor unit 40 includes an insulating substrate 401 preferably having a flat shape. The insulating substrate 401 is made of a material which has translucency and preferably does not have birefringence. A plurality of electrodes 402 are formed on one plane of the insulating substrate 401. A plurality of electrodes 403 are formed on the other plane. The electrodes 402 are each formed in an elongated shape elongated in the X direction, and are disposed at intervals along the Y direction. A plurality of electrodes 403 are each formed in an elongated shape elongated in the Y direction, and are disposed at intervals along the X direction. As a result, the electrodes 402 and 403 are disposed to intersect at approximately 90° when viewed from the Z direction. These electrodes 402 and 403 are preferably translucent.

Each electrode 402 crosses each electrode 403 at a distinct point on the x-y grid of electrodes. Each crossing point on the grid corresponds to a unique pair of electrodes 402, 403. There is a change of a capacitance of the pair when the user's finger or the like approaches the operation surface 51 at a location corresponding to the pair. The pair(s) of electrodes which have detected the change of capacitance output a capacitance detection signal corresponding to the change of the capacitance while one of the electrodes 402 and 403 is used as a reference potential. The outputted capacitance detection signal is inputted to the arithmetic circuit module 60 via a wiring which is not illustrated.

The press sensor unit 20 includes a piezoelectric film 201 preferably having a flat film shape. Electrodes 202 and 203 are formed on opposite flat surfaces of the piezoelectric film 201. The electrodes 202 and 203 are preferably formed on nearly the entire flat surfaces of the piezoelectric film 201.

The piezoelectric film 201 is preferably a film made of chiral polymers. For the chiral polymers, polylactic acid (PLA) and, more particularly, poly-L-lactic acid (PLLA) is used in the present embodiment. The PLLA is uniaxially stretched. The chiral polymers have high transparency compared to that of PVDF, and therefore, the piezoelectric film 201 is made of chiral polymers, so that images displayed on the display panel unit 30 are easily viewed.

The PLLA made of chiral polymer has a main chain which adopts a spiral structure. The PLLA has piezoelectricity when uniaxially stretched molecules are oriented. Further, the uniaxially stretched PLLA produces electric charges when the flat surface of the piezoelectric film 201 is pressed.

In this regard, the amount of electric charges to be produced depends on the amount of displacement at which the flat surface is displaced in a direction orthogonal to the flat surface according to a press amount.

Further, the PLLA produces piezoelectricity by molecule orientation processing such as stretching, and does not need to be subjected to polling processing unlike other polymers such as PVDF or piezoelectric ceramics. That is, the piezoelectricity of the PLLA which does not belong to ferroelectrics does not appear as a result of ion polarization unlike ferroelectrics such as PVDF and PZT, and derives from a spiral structure which is a characteristic structure of molecules. Hence, the PLLA does not produce pyroelectricity produced in piezoelectric bodies of the other ferroelectrics. Further, the PVDF or the like shows a temporal fluctuation of a piezoelectric constant, and the piezoelectric constant lowers significantly depending on cases. However, the piezoelectric constant of the PLLA is temporarily very stable. Consequently, it is possible to detect displacement caused by a press with a high sensitivity without influencing surrounding environment.

For the electrodes 202 and 203, it is suitable to use ones of inorganic electrodes such as ITO, ZnO, silver nanowires, carbon nanotubes and graphene, and organic electrodes whose main components are polythiophene and polyaniline. By using these materials, it is possible to form a highly translucent conductor pattern. By providing these electrodes 202 and 203, it is possible to obtain electric charges produced by the piezoelectric film 201 as a potential difference, and to output a press amount detection signal whose voltage value corresponds to a press amount. The press amount detection signal is outputted to the arithmetic circuit module 60 via a wiring which is not illustrated.

The operation surface 51, the press sensor unit 20 and the position detection sensor unit 40 each preferably have translucency and enable images displayed on the display panel unit 30 to be viewed there through.

The arithmetic circuit module 60 detects a touch position of a touch operation from a combination of the electrodes 402 and 403 which have outputted the capacitance detection signal. Further, the arithmetic circuit module 60 calculates a pressing force based on the press force detection signal outputted from the press sensor unit 20. When the arithmetic circuit module 60 calculates the pressing force, and the pressing force exceeds a threshold, the arithmetic circuit module 60 determines that the operation surface 51 has been pressed by the touch operation. In contrast, when the calculated pressing force does not exceed the threshold, the arithmetic circuit module 60 determines that the operation surface 51 has not been pressed even when the user lightly presses the operation surface 51. Consequently, it is possible to prevent erroneous determination that the operation surface 51 has been pressed by a touch operation when the user does not have an intent to press the operation surface 51.

The arithmetic circuit module 60 will be further described in detail below.

Figure 8:
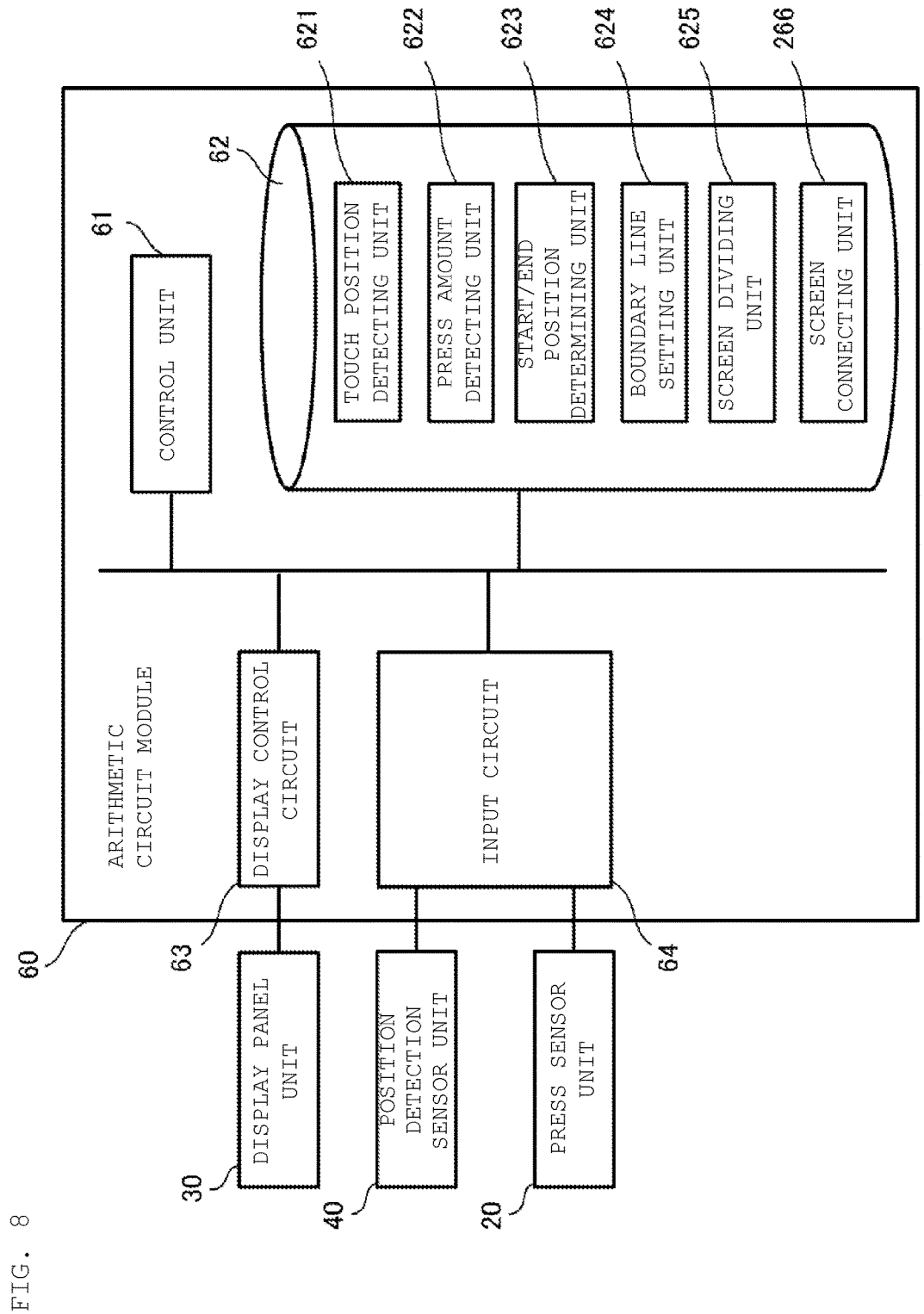
FIG. 8 is a block diagram illustrating a configuration of an arithmetic circuit module forming part of the first embodiment.

FIG. 8 is a block diagram illustrating a configuration of the arithmetic circuit module 60. The arithmetic circuit module 60 includes a control unit 61, a memory 62, a display control circuit 63 and an input circuit 64.

The control unit 61 is preferably a CPU or the like, and controls the entire operation of the arithmetic circuit module 60 according to programs stored in the memory 62. The memory 62 is a RAM, a ROM and the like, stores a control program and successively stores arithmetic processing results. The display control circuit 63 displays images on the display panel unit 30 according to a control signal from the control unit 61. The input circuit 64 receives a touch signal (in the disclosed embodiment a plurality of capacitance detection signals) from the position detection sensor unit 40 and receives an input of a press force signal from the press sensor unit 20.

The control unit 61 functions as a touch position detecting unit 621, a press force detecting unit 622, a start/end position determining unit 623, a boundary line setting unit 624, a screen dividing unit 625 and a screen connecting unit 626 by executing the programs stored in the memory 62. Alternatively these units can be formed entirely or partially in hardware.

The touch position detecting unit 621 detects a touch position based on the plurality of capacitance detection signals (touch signals) received from the input circuit 64. Each capacitance detection signal is outputted from a respective pair of electrodes 402 and 403 whose capacitance changes when the user performs a touch operation as described above. The touch position detecting unit 621 determines which pair of electrodes 402 and 403 has the highest level and information (position coordinate) about the location where this pair of electrodes 402 and 403 cross (i.e., an operation input detection position) is stored in memory 62. The touch position detecting unit 621 reads the position coordinate associated with the pair whose signal level is the highest from memory 62.

The press amount detecting unit 622 detects a pressing force with which the user presses down on the operation surface 51 based on the press force detection signal received from the input circuit 64. Each press force detection signal is output from the electrodes 202 and 203 according to a potential difference produced in the piezoelectric film 201 which has been deformed by a press of the user's finger on the operation surface 51 as described above. In the memory 62, signal levels of press force detection signals and press force are associated and stored. The press force detecting unit 622 reads the press force associated with the signal level of the inputted press force detection signal from the memory 62.

The start/end position determining unit 623 determines a start position and an end position of a dividing operation for setting a boundary line. When the touch position detecting unit 621 detects a position coordinate, the start/end position determining unit 623 determines whether or not the press force detected by the press force detecting unit 622 is at least a threshold value (which preferably can be adjusted by the user of the display device) when the start/end position determining unit 623 determines the detected position coordinate as the start position. When the press force is below the threshold level, the detected position coordinate is not determined as the start position, so that it is possible to prevent erroneous determination that a touch operation which is not intended by the user is a dividing operation.

The start/end position determining unit 623 determines the start position and then determines an end position of the dividing operation. The start/end position determining unit 623 may determine as the end position of the dividing operation a coordinate position detected immediately before the touch position detecting unit 621 no longer detects coordinate positions. Further, when the user presses the operation surface 51 at a touch position which the user wants to use as an end position and according to a press amount equal to or more than the threshold value (if desired, different threshold value can be used for determining the start and end touch positions), the start/end position determining unit 623 may determine this position as the end position. In this case, it is possible to clarify the end of the user's dividing operation.

The boundary line setting unit 624 sets a boundary line. More specifically, the boundary line setting unit 624 generates a line from the start position determined by the start/end position determining unit 623 to the end position determined by the start/end position determining unit 623 along the trajectory 2A (see FIG. 1) of the user's finger. In this case, when the trajectory 2A of the user's finger sways back and forth in the X direction or the Y direction, i.e., when the trajectory 2A forms a curved line, the boundary line setting unit 624 corrects a curved portion of the trajectory 2A to a linear line.

As illustrated in FIGS. 1 to 4, when a start position and an end position are distant (i.e., are located at positions which are separated by more than a predetermined distance, e.g., 1 cm), the boundary line setting unit 624 generates along the trajectory of the finger the boundary lines 2B, 2C and 2D connecting the start position and the end position. In this case, when the start position and the end position are not at edges within a predetermined distance from the edges of the display screen 2, the boundary line setting unit 624 preferably extends the generated boundary line until the boundary line reaches the edges of the display screen 2.

In contrast, when the start position and the end position substantially match, as illustrated in FIG. 5, the boundary line setting unit 624 generates the boundary line 2E in the shape of a loop which generally follows the trajectory of the finger as it was moved from the start to the end position. That the start position and the end position substantially match means that a length of a linear line connecting the start position and the end position is, for example, 1 cm or less.

The screen dividing unit 625 divides the display screen 2 based on the boundary line set by the boundary line setting unit 624. In the present embodiment, as illustrated in FIG. 1 and other figures, the display screen 2 is divided into the first and second screen sections 3 and 4.

The screen connecting unit 626 detects a user's connecting operation and merges the first and second screen sections 3 and 4. When the touch position detecting unit 621 detects the position coordinate in a state where the first screen 3 and the second screen 4 are generated, the screen connecting unit 626 determines whether or not this position coordinate is on (or near, e.g., within 1 cm) the set boundary line and, in this case, whether the press force detected by the press force detecting unit 622 is at least a threshold value. When the detected position coordinate is on the boundary line and the detected force amount is at least the threshold value, the screen connecting unit 626 intermittently obtains position coordinates of touch positions detected by the touch position detecting unit 621, and determines whether the finger has been slid along the boundary line. When the finger slides along the boundary line, the screen connecting unit 626 recognizes that the user has performed the connecting operation and connects the first and screen sections 3 and 4. Thus, only an image having contents corresponding to one function executed by the mobile terminal device 1 is displayed on the display screen 2.

Figure 9:
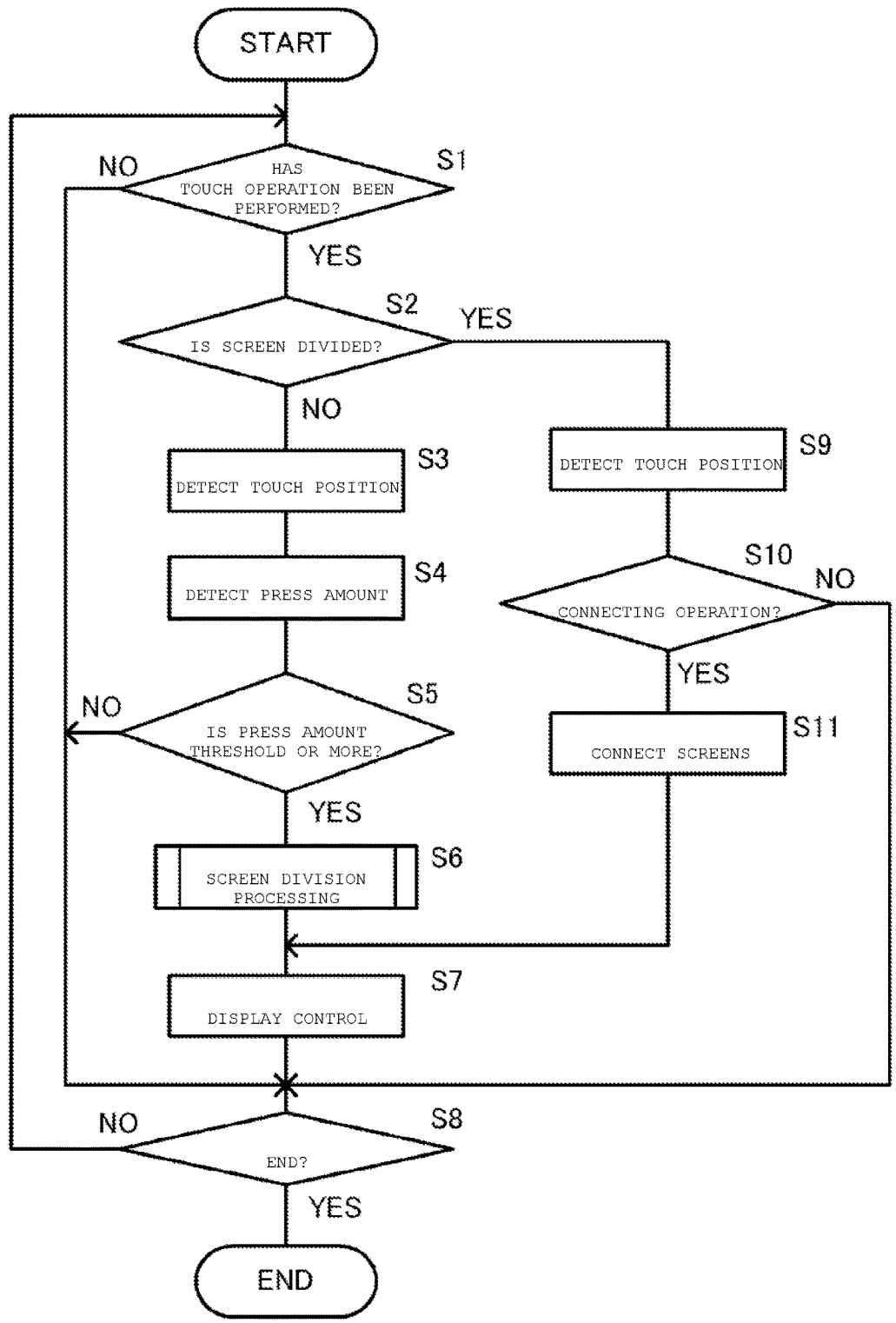
FIG. 9 is a flowchart of processing executed by the arithmetic circuit module of FIG. 8.

FIG. 9 is a flowchart of processing executed by the arithmetic circuit module 60.

The control unit 61 determines whether or not a touch operation has been performed, i.e., whether or not a capacitance detection signal has been input from the position detection sensor unit 40 (S1). In case where the touch operation has not been performed (S1: NO), the control unit 61 moves to processing in S8. In case where the touch operation has been performed (S1: YES), the control unit 61 determines whether or not the display screen 2 is divided (S2).

When the screen is not divided (S2: NO), the control unit 61 detects a position coordinate of a touch position from the input capacitance detection signal (S3), and detects a press force at the position coordinate (S4). The control unit 61 determines whether or not the press force is at least the threshold level (S5), and, when the press force is less than the threshold level (S5: NO), the control unit 61 determines that the touch operation is not a dividing operation, and executes the processing in S8. When the press force is at least the threshold level (S5: YES), the control unit 61 executes screen division processing (S6).

Figure 10:
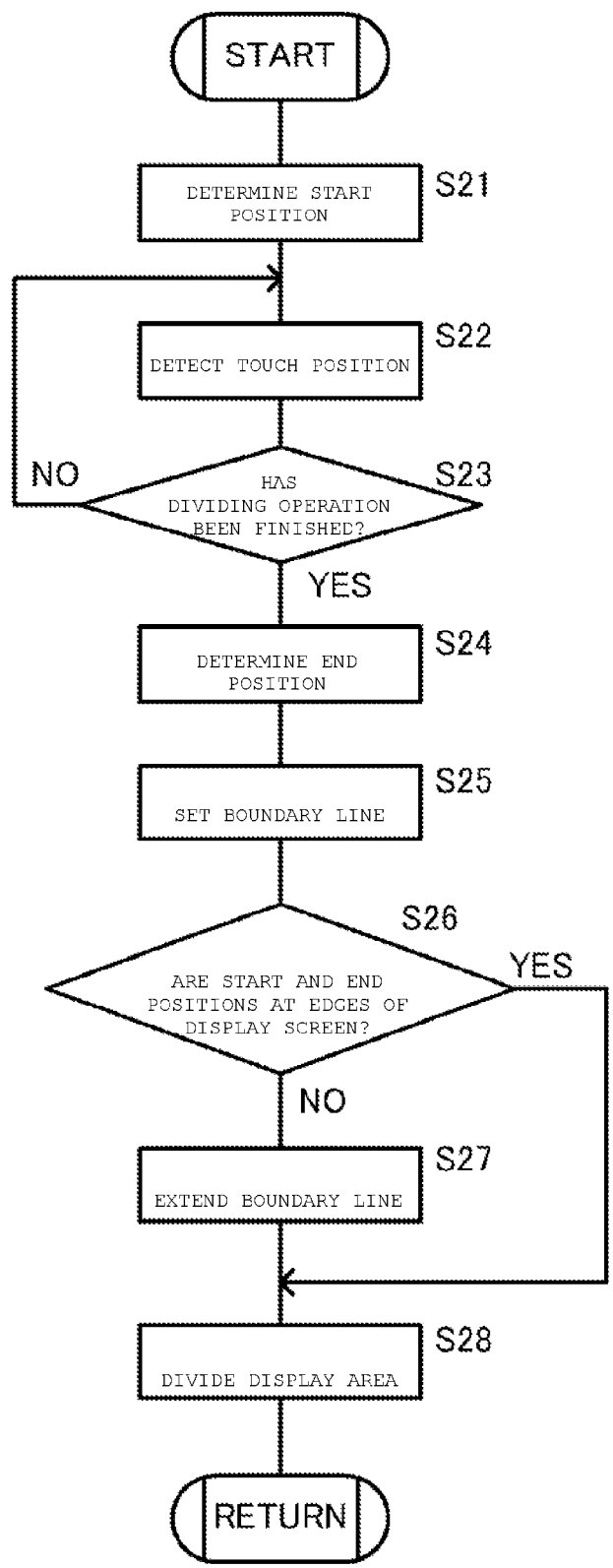
FIG. 10 is a view illustrating a flowchart of screen division processing carried out by the arithmetic circuit module of FIG. 9.

FIG. 10 is a view illustrating a flowchart of the screen division processing.

The control unit 61 determines the touch position detected in S3 as a start position of the dividing operation (S21). Next, the control unit 61 detects the touch position (S22) and determines whether the dividing operation has been completed (S23). This may be determined by determining whether the touch position detecting unit 621 no longer detects touch positions, or by determining whether or not the operation surface 51 has been pressed with a force equal to or more than the threshold value. When the dividing operation is not finished (S23: NO), the control unit 61 returns to processing in S22. Thus, until the dividing operation is finished, the control unit 61 intermediately detects touch positions and thereby detects the trajectory of the user's finger.

When the dividing operation has been finished (S23: YES), the control unit 61 determines an end position of the dividing operation (S24). The end position may be determined, for example, by determining as the end position a touch position detected immediately before the touch position detecting unit 621 no longer detects coordinate positions, or by determining as the end position the touch position at which a press force equal to or more than the threshold value has been detected.

The control unit 61 sets a boundary line along the trajectory of the sliding finger which connects the start position and the end position (S25). In this case, when the trajectory of the user's finger sways back and forth in the X or Y directions, i.e., the trajectory of the finger is a curved line, the control unit 61 corrects the trajectory to a linear line and generates a boundary line which connects the start position and the end position along the corrected trajectory.

The control unit 61 determines whether or not the start position and the end position of the dividing operation are at the edges of the display screen 2 (S26). When they are not (S26: NO) the control unit 61 extends the boundary line to the edges of the display screen 2 (S27). Further, the control unit 61 divides the display screen 2 into the first screen 3 and the second screen 4 at the set boundary line (S28). When the start position and the end position of the dividing operation are at the edges of the display screen 2 (S26: NO), the control unit 61 executes processing in S28.

Returning to FIG. 9, when finishing the screen division processing (S6), the control unit 61 performs image display control on the first and second screen sections 3 and 4, respectively (S7). For example, the control unit 61 outputs position coordinates of the generated first screen section 3 and second screen section 4 to the display control circuit 63, and the display control circuit 63 displays images on the first screen section 3 and the second screen section 4 according to the position coordinates.

The control unit 61 determines whether to finish processing since, for example, the mobile terminal device 1 is powered off (S8). When the control unit 61 does not finish the processing (S8: NO), the processing returns to S1. When the control unit 61 finishes the processing (S8: YES), this processing is finished.

Meanwhile, when determining in S2 that the screen has been divided (S2: YES), the control unit 61 detects a position coordinate of a touch position based on the inputted capacitance detection signal (S9). The control unit 61 determines whether or not the connecting operation has been performed (S10). More specifically, the control unit 61 determines whether or not the touch position detected in S9 is positioned on (or near, e.g., within 1 cm) the set boundary line, and whether or not the trajectory of the sliding finger lies along the boundary line.

In a case where the merging operation has been performed (S10: YES), the control unit 61 merges the first and second screens 3 and 4 (S11) into a single screen. Further, the control unit 61 performs the processing in S7. In case where the merging operation is not performed (S10: NO), the control unit 61 executes the processing in S8.

In the present embodiment, the display screen 2 is divided into two sections. However, the display screen 2 may be divided into three or more sections.

Figure 11:
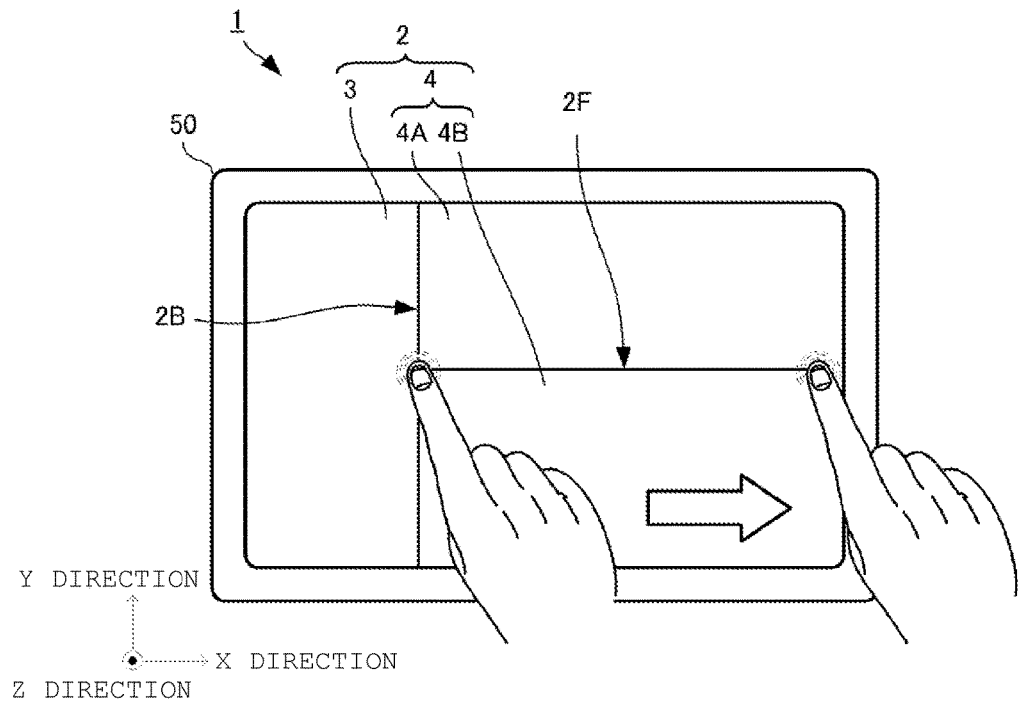
FIG. 11 is a view for explaining a case where a display screen is divided into three.

FIG. 11 is a view for explaining a case where a display screen 2 is divided into three sections. In this example, the boundary line 2B is pressed by the user's finger, and the finger is slid from this position in the X direction to set the boundary line 2F. Thus, the second screen 4 is further divided into a third and fourth screen sections 4A and 4B, and the display screen 2 is thus divided into three sections. A method for setting this boundary line 2F sets as the boundary line 2F a linear line which extends from a start position to an end position when the start position is positioned on the boundary line 2B. The display screen 2 is divided into the first screen section 3, the third screen section 4A and the fourth screen section 4B based on these boundary lines 2B and 2F.

Further, in the present embodiment, when a trajectory of a user's finger is a curved line, a boundary line is set by correcting the curved line to a linear line. However, without correcting the trajectory, a boundary line may be set according to the actual trajectory of the user's finger.

Figure 12:
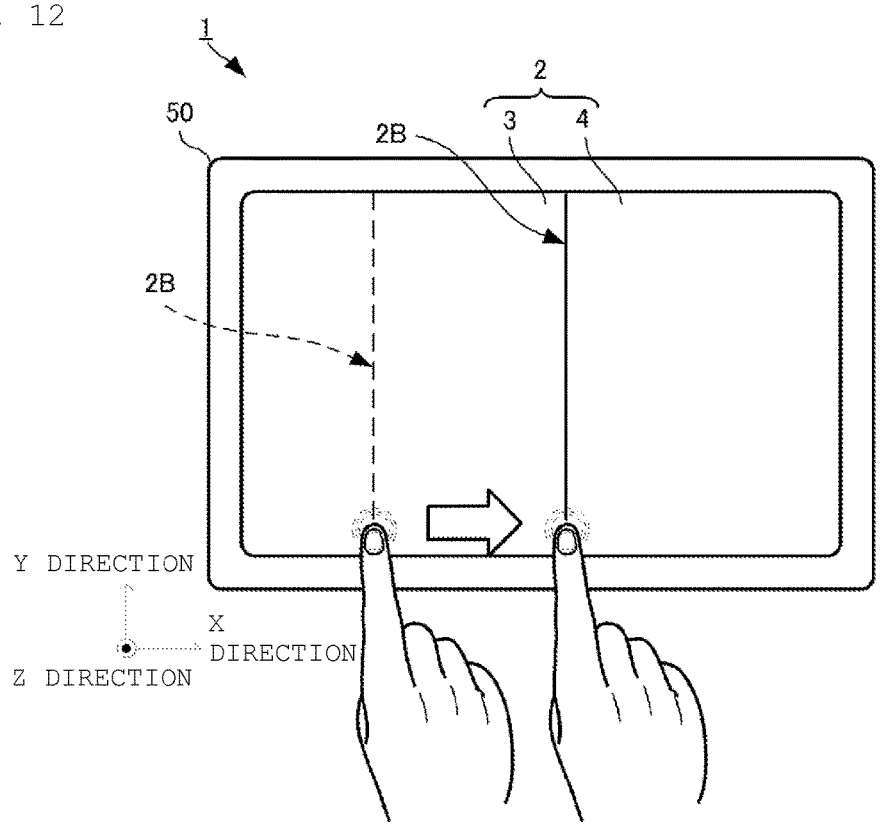
FIG. 12 is a view for explaining a case where a previously set boundary line is moved.

FIG. 12 is a view for explaining a case where a set boundary line is changed.

When a linear boundary line 2B which lies along a Y direction is set to a display screen 2, and when, in this state, a user touches an arbitrary position on the boundary line 2B using his or her finger and slides his or her finger in the X direction, the boundary line 2B moves in the X direction as the user's finger slides.

As the boundary line 2B moves, a first screen section 3 widens and a second screen section 4 narrows. Thus, even after the positions of the first screen section 3 and the second screen section 4 are set, it is possible to easily change the size of the first and second screen sections 3 and 4. A touch operation of changing the boundary line 2B will be referred to hereinafter as a changing operation below.

The configuration of the mobile terminal device 1 in this embodiment is the same as the configuration described with reference to FIGS. 6 and 7 and therefore will not be further described.

Figure 13:
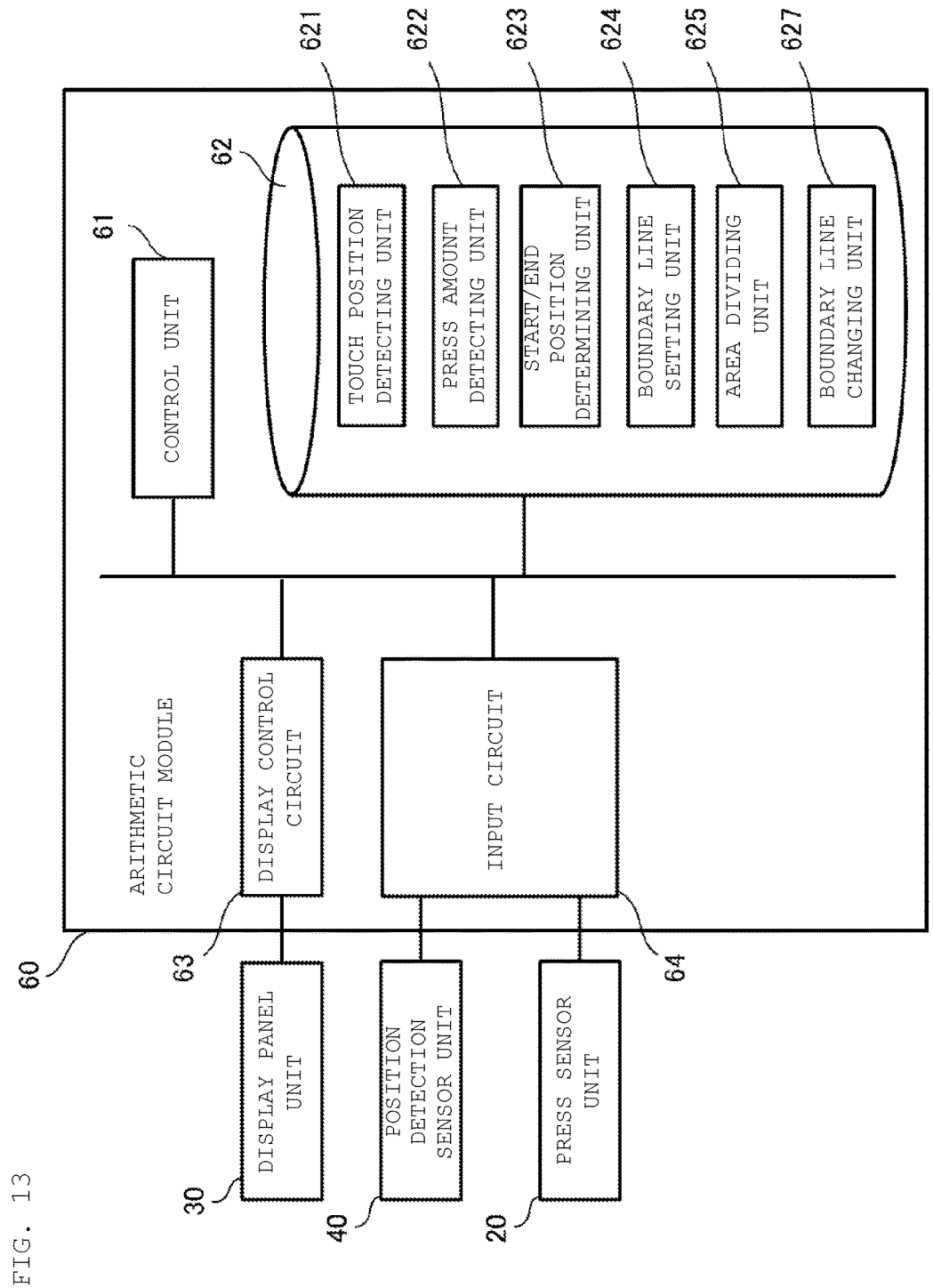
FIG. 13 is a block diagram illustrating a configuration of an arithmetic circuit module in accordance with a further embodiment of the invention.

FIG. 13 is a block diagram illustrating a configuration of an arithmetic circuit module 60 for this embodiment. The arithmetic circuit module 60 includes a control unit 61, a memory 62, a display control circuit 63 and an input circuit 64. The control unit 61 functions as a touch position detecting unit 621, a press force detecting unit 622, a start/end position determining unit 623, a boundary line setting unit 624, a screen dividing unit 625 and a boundary changing unit 627 by executing appropriate programs.

When a touch operation is performed, the boundary changing unit 627 determines whether or not a position coordinate detected by the touch position detecting unit 621 is on the boundary line 2B (or near the boundary line 2B, e.g., within 1 cm of the boundary line). The boundary changing unit 627 determines that the touch operation performed is a changing operation when the detected position coordinate is on the boundary line 2B, and changes a position of the boundary line 2B according to the movement of the user's finger in the X direction. When the changing operation is finished, the boundary changing unit 627 sets the boundary line 2B such that the boundary line 2B is positioned on an end position of the changing operation.

In addition, the boundary changing unit 627 may, for example, determine that the changing operation has ended when touch positions are no longer detected after the touch has moved, or may determine that the changing operation has ended when the force with which the user presses on the display screen is less than the threshold value.

Figure 14:
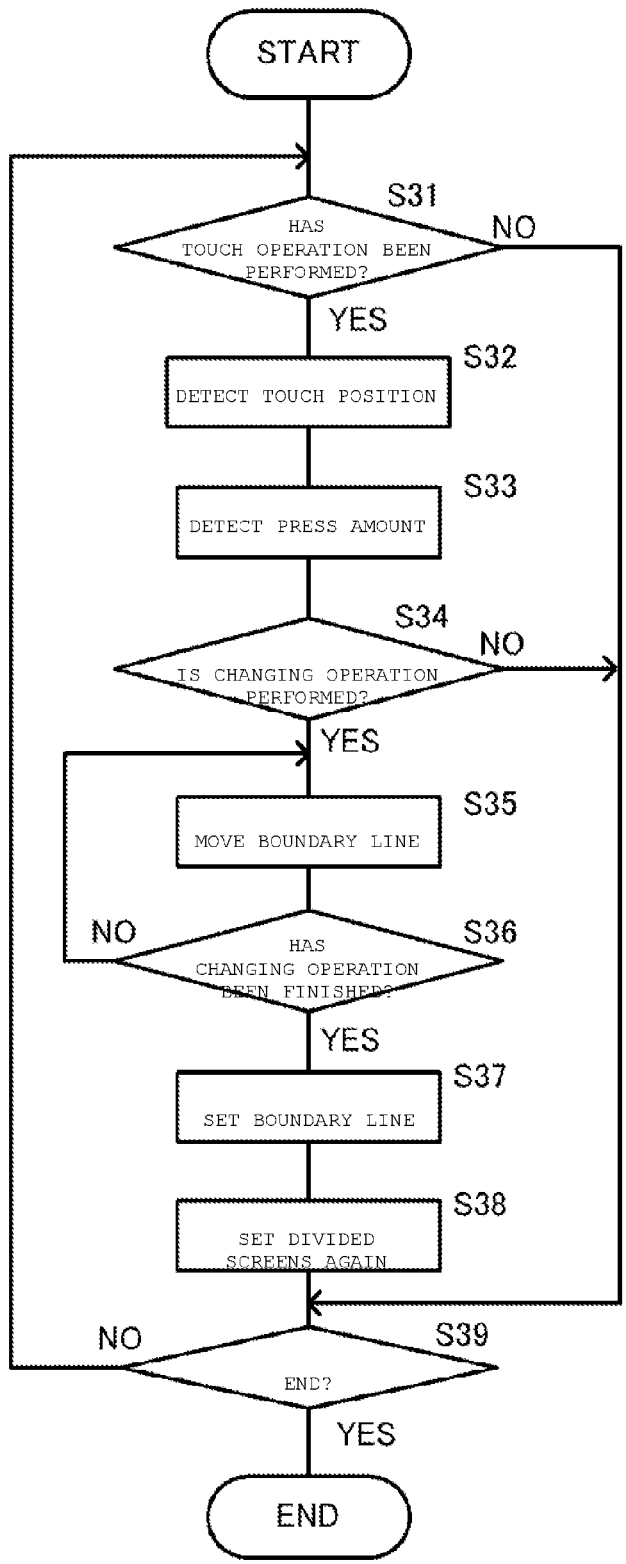
FIG. 14 is a flowchart of processing executed by the arithmetic circuit module of FIG. 13.

FIG. 14 is a view illustrating a flowchart of processing executed by the arithmetic circuit module 60 of FIG. 13. The flowchart illustrated in FIG. 14 is executed in a state where the boundary line 2B has already been set, and the first and second screen sections 3 and 4 have been set.

The control unit 61 determines whether or not the touch operation has been detected, i.e., whether or not a capacitance detection signal has been inputted from a position detection sensor unit 40 (S31). When detecting no touch operation (S31: NO), the control unit 61 executes processing in S29. When detecting the touch operation (S31: YES), the control unit 61 detects a position coordinate of the touch position based on the inputted capacitance detection signal (S32), and detects a press force for the position coordinate (S33).

The control unit 61 determines whether the detected touch operation is a changing operation (S34). More specifically, the control unit 61 determines whether the touch position detected in S22 is on the boundary line 2B (or near the boundary line 2B) and whether or not the press force detected in S33 is at least a threshold value. When the detected touch position is on the boundary line 2B and the detected press force is at least the threshold level, the control unit 61 determines that the detected touch operation is the changing operation.

When the detected touch operation is not the changing operation (S34: NO), the control unit 61 executes processing in S39. When the detected touch operation is the changing operation (S34: YES), the control unit 61 performs processing of moving the boundary line 2B (S35). For example, the control unit 61 intermittently detects touch positions and moves the boundary line 2B as the user's finger is moved along the X direction.

The control unit 61 determines whether or not the changing operation has been completed (S36). The control unit 61 determines that the changing operation has been completed when touch positions are no longer detected or when the pressing force is less than the threshold value. In the case where the changing operation is not finished (S36: NO), the control unit 61 executes processing in S35. In the case where the changing operation has been finished (S36: YES), the control unit 61 sets the boundary line 2B at the end position of the changing operation (S37) and resets the locations of the first and second screen sections 3 and 4 based on the newly set boundary line 2B (S38). Consequently, it is possible to change the sizes of the first and second screen sections 3 and 4.

The control unit 61 determines whether or not to finish the processing, for example, when the mobile terminal device 1 is powered off (S39). When not finishing the processing (S39: NO), the control unit 61 executes processing in S31. When finishing the processing (S39: YES), this processing is finished.

Consequently, according to the present embodiment, it is possible to change the position of a boundary line and, consequently, to change the sizes of the first and second screen sections 3 and 4. In addition, in the present embodiment, the boundary line may be deleted to merge the first and second screen sections 3 and 4 into a single screen in a manner similar to that of the above embodiments.

A further embodiment of the invention will now be described. In this example, a mobile terminal device which can set a boundary line by pressing a vicinity of an edge portion of a display screen will be described.

Figure 15:
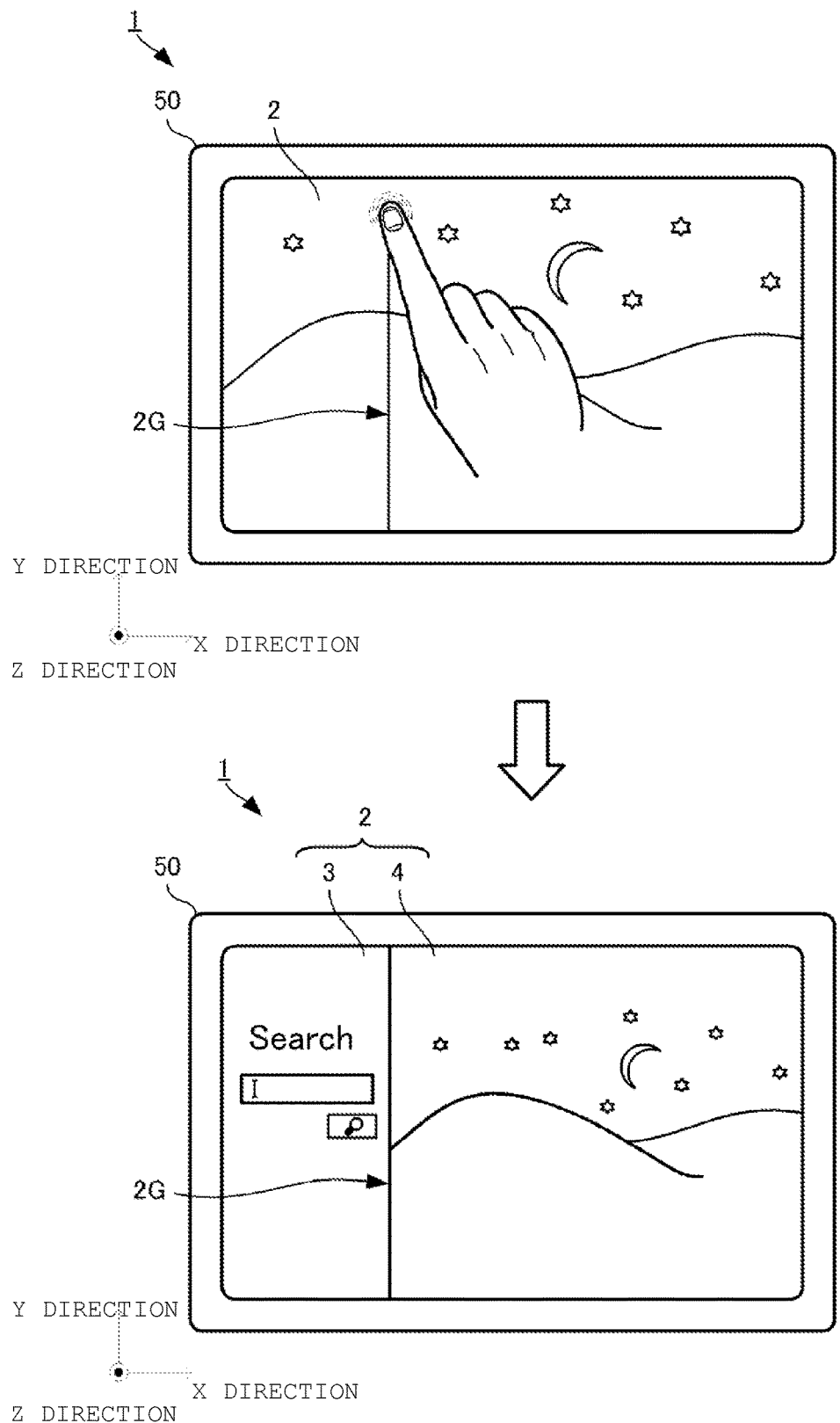
FIG. 15 is a view for explaining a case where a boundary line is set by pressing a single point on the display screen.

FIG. 15 is a view for explaining a case where a boundary line is set by pressing a single point. In this example, when a user presses the display screen 2 in the vicinity of the edge portion of the display screen in a Y direction, a boundary line 2G extending in a predetermined direction (a Y direction in FIG. 15) from a pressing position is set. In this case, the user can set the boundary line by pressing only one point and, consequently, can easily perform a setting operation of setting the boundary line.

In addition, the pressing position may be near an edge portion of the display screen 2 in the X direction (e.g., within 1 cm of the edge portion). Further, a direction in which a boundary line is set based on a pressing position may be the X direction or a direction which inclines with respect to the X direction and the Y direction.

The configuration of the mobile terminal device 1 is otherwise the same as FIGS. 6 and 7 and therefore will not be described further.

Figure 16:
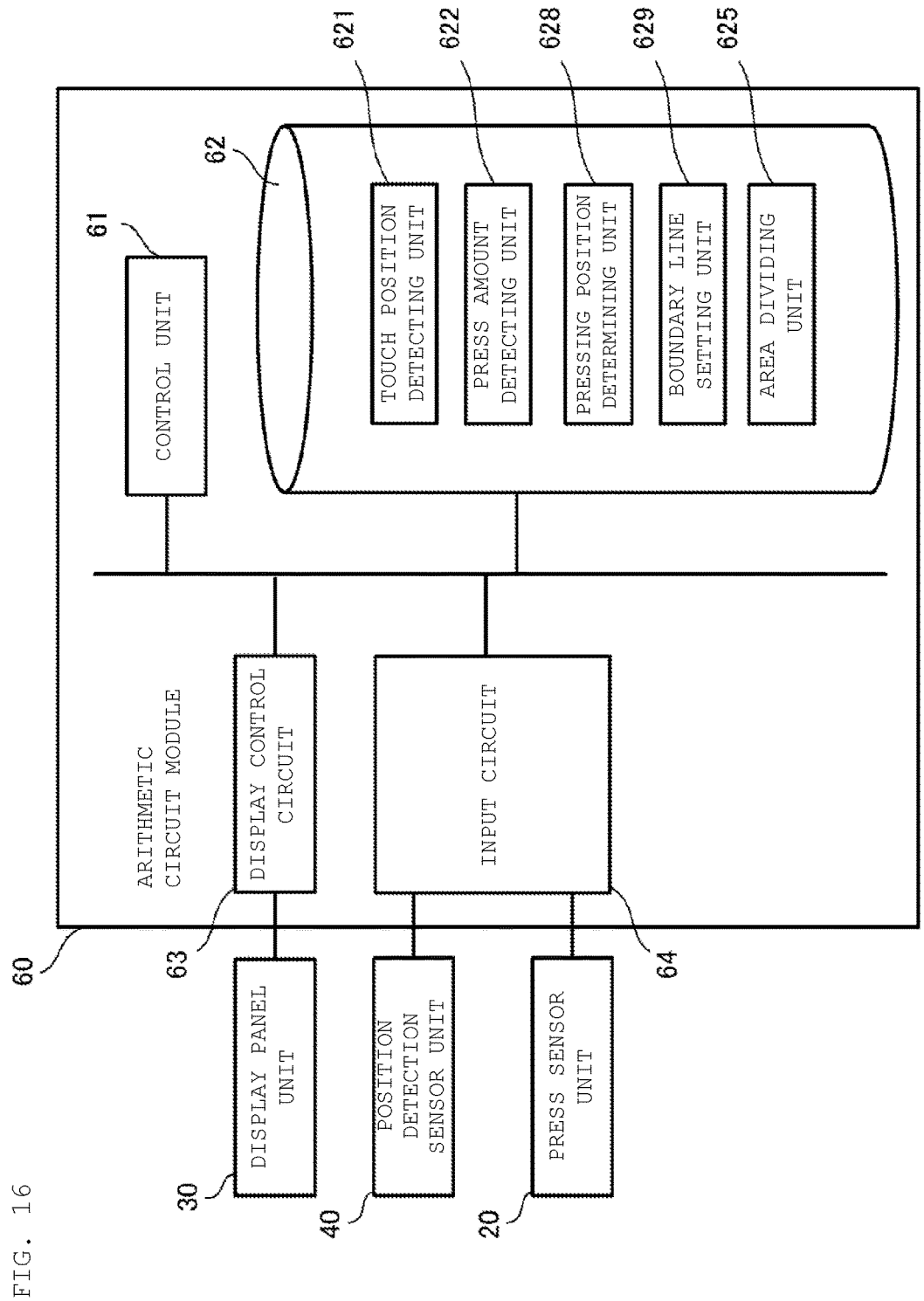
FIG. 16 is a block diagram illustrating a configuration of an arithmetic circuit module in accordance with a third embodiment of the invention.

FIG. 16 is a block diagram illustrating a configuration of an arithmetic circuit module 60 for this embodiment. The arithmetic circuit module 60 includes a control unit 61, a memory 62, a display control circuit 63 and an input circuit 64. The control unit 61 functions as a touch position detecting unit 621, a press force detecting unit 622, a pressing position determining unit 628, a boundary line setting unit 629 and a screen dividing unit 625 by executing appropriate programs.

When the touch position detecting unit 621 detects a position coordinate, the pressing position determining unit 628 determines whether or not a press force detected by the press force detecting unit 622 during the detection is at least a threshold value. Further, when the detected press amount is at least the threshold value, the pressing position determining unit 628 determines whether or not the detected position coordinate is near an edge portion (e.g., within 1 cm of the edge portion) of the display screen 2.

When the pressing position determining unit 628 determines that the pressing position is near the edge portion of the display screen 2, the boundary line setting unit 629 sets a boundary line extending in a predetermined direction from this pressing position.

Figure 17:
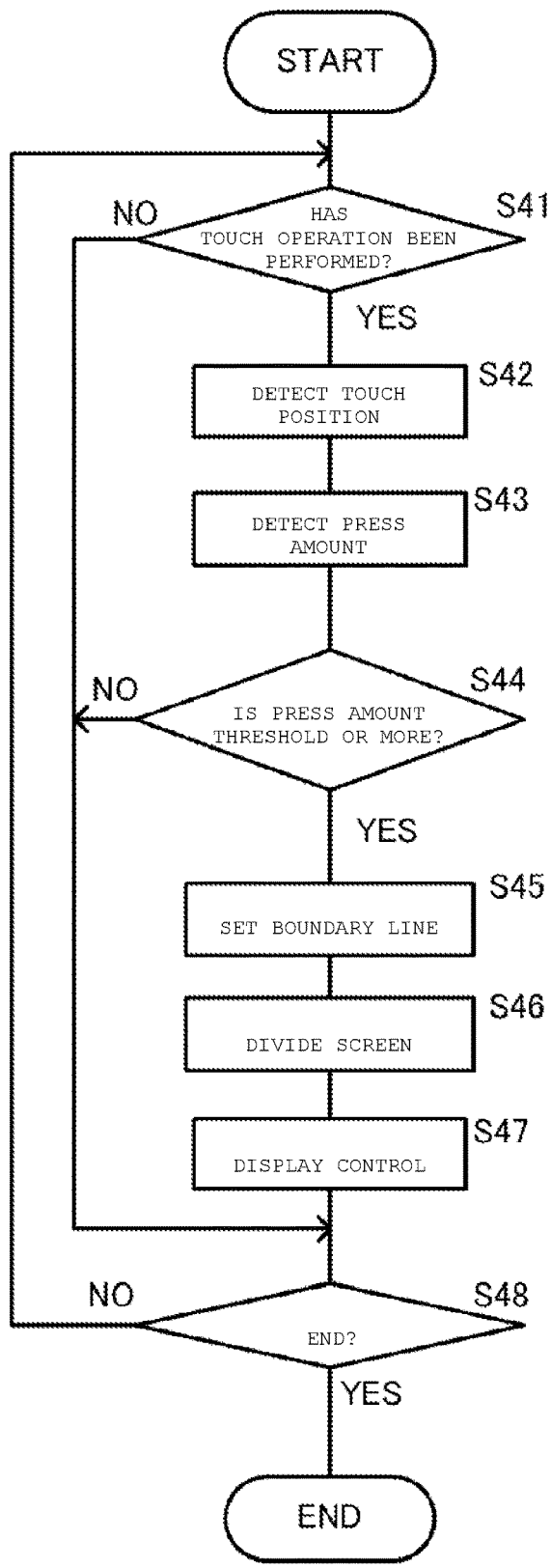
FIG. 17 is a flowchart of processing executed by the arithmetic circuit module of FIG. 16.

FIG. 17 is a view illustrating a flowchart of processing executed by the arithmetic circuit module 60 of FIG. 16.

The control unit 61 determines whether or not a touch operation has been performed, i.e., whether or not a capacitance detection signal has been inputted from a position detection sensor unit 40 (S41). In case where the touch operation has not been performed (S41: NO), the control unit 61 moves to processing in S48. In case where the touch operation has been performed (S41: YES), the control unit 61 detects a position coordinate of the touch position based on the inputted capacitance detection signal (S42), and detects a press force for the position coordinate (S43).

The control unit 61 determines whether or not the press force is at least a threshold value (S44) and, when not (S44: NO), the control unit 61 determines that the touch operation is not a dividing operation and executes processing in S48. When the press force is at least the threshold value (S44: YES), the control unit 61 sets a boundary line extending in a predetermined direction from the touch position detected in S42 (S45).

The control unit 61 divides the display screen 2 into first and second screen sections 3 and 4 based on the set boundary line (S46) and performs image display control on the first and second screen sections 3 and 4, respectively (S47). Further, the control unit 61 determines whether to finish processing, for example, when the mobile terminal device 1 is powered off (S48). When the processing is not finished (S48: NO), the processing returns to S41. When the processing is finished (S48: YES), this processing is finished.

As described above, according to the present embodiment, by pressing only a single point of the display screen 2, it is possible to set a boundary line and to divide the display screen 2. In addition, it may be possible to remerge the divided first screen 3 and second screen 4 or change a set boundary line as described above.

Further, in the present embodiment, a boundary line is set when the edge portion of the display screen 2 is pressed. Even when a boundary line is distant from the edge portion of the display screen 2, the boundary line extending in a preset direction from a pressing position may be set. Further, a plurality of directions in which boundary lines extend may be prepared in advance to change the directions according to a press amount.

The invention claimed is:

1. A non-transitory computer readable memory containing a program which, when ran on one or more processors connected to a display device having a display screen, a touch sensor for detecting a position on the display screen that is touched by a user of the display device and for generating a touch signal as a function thereof and a press sensor for detecting the force with which the user touches the display screen and for generating a press force signal as a function thereof, will allow the one or more computers to:
   (1) cause the display screen to display one or more images at respective locations of the display screen; and
   (2) determine, as a function of the touch signal, that the user has touched the touch screen and:
      (a) if the press force signal indicates that the force with which the user has touched the display is less than a first predetermined value, carrying out an operation to change one or more of the images displayed on the display screen; and
      (b) when the press force signal indicates that the force with which the user has touched the display is greater than a second predetermined value, carrying out a screen dividing function by dividing the display into first and second sections along a dividing line and displaying separate content in the first and second sections.

2. The non-transitory computer readable memory of claim 1, wherein program divides the display screen into the at least two sections when the press force signal indicates that the force with which the user has touched the display is greater than a second predetermined value as a function of the movement of the user's finger along the display screen.

3. The non-transitory computer readable memory of claim 2, wherein the program determines that the user's finger has moved along the display screen by detecting that the user has touched the display screen with at least a threshold pressure and, while maintaining at least the second threshold pressure, moves his or her finger at least a predetermined distance along the display screen.

4. A display device comprising:
(a) a display screen;
(b) a touch sensor for detecting a position on the display screen that is touched by a user of the display device and for generating a touch signal as a function thereof;
(c) a press sensor for detecting the force with which the user touches the display screen and for generating a press force signal as a function thereof; and
(d) a display screen controller for controlling the display screen by:
  (1) causing the display screen to display one or more images at respective locations of the display screen; and
  (2) determining, as a function of the touch signal, that the user has touched the touch screen and:
    (a) if the press force signal indicates that the force with which the user has touched the display is less than a first predetermined value, carrying out an operation to change one or more of the images displayed on the display screen; and
    (b) when the press force signal indicates that the force with which the user has touched the display is greater than a second predetermined value which is greater than or equal to the first predetermined value, carrying out a screen dividing function by dividing the display into first and second sections along a dividing line and displaying separate content in the first and second sections.

5. The display device of claim 4, wherein the separate content in the first and second sections relate to different functions of the display device.

6. The display device of claim 4, wherein when the display screen controller detects the fact that the user of the display device has touched a point on the display screen located within a predetermined distance from an edge of the display screen with a force which is equal to or greater than the second predetermined value, the dividing line extends through the touched point.

7. The display device of claim 4, wherein the display screen has a length and a width and the dividing line extends obliquely to both the length and the width.

8. The display device of claim 4, wherein the display screen controller also remerges the divided screen sections into a single screen section as a function of the touch signal and the press force signal.

9. The display device of claim 4, wherein the press sensor includes a flat piezoelectric film which is provided along a plane surface of the display screen and which is made of a chiral polymer.

10. The display device of claim 9, wherein the chiral polymer is polylactic acid.

11. The display device according to claim 10, wherein the chiral polymer is poly-L-lactic acid.

12. The display device according to claim 4, wherein the direction of the dividing line varies as a function of the pressing force applied to the touch screen.

13. The display device according to claim 4, wherein the display screen controller remerges the display screen into a single section when the user moves his or her finger along the dividing line.

14. The display device according to claim 4, wherein the display screen controller remerges the display screen into a single section when the user moves his or her finger along the dividing line from a position located in the edge portion and does not remerge the display screen into a single section when the user moves his or her finger along the dividing line starting from a position outside of the edge portion.

15. The display device according to claim 4, wherein the display screen controller allows the user to laterally move the dividing line, without dividing either of the first and second sections into subsections, by laterally dragging the dividing line along the display screen.

16. The display device of claim 15, wherein the display screen controller determines that the user's finger has moved along the display screen by detecting that the user has touched an edge portion of the display screen with at least a threshold force, the edge portion being a predetermined portion along the edges of the display screen, and, while maintaining at least the threshold force, moves his or her finger at least a predetermined lateral distance along the display screen.

17. The display device according to claim 4, wherein the first and second predetermined values are equal.

* * * * *